(12) United States Patent
Delaporte et al.

(10) Patent No.: US 11,166,117 B2
(45) Date of Patent: Nov. 2, 2021

(54) SOUND DIFFUSION SYSTEM EMBEDDED IN A RAILWAY VEHICLE AND ASSOCIATED VEHICLE, METHOD AND COMPUTER PROGRAM

(71) Applicant: SpeedInnov, Paris (FR)

(72) Inventors: Matthieu Delaporte, Aytre (FR); Bruno Lemaitre, Puilboreau (FR)

(73) Assignee: SPEEDINNOV, Paris (FR)

( * ) Notice: Subject to any disclaimer, the term of this patent is extended or adjusted under 35 U.S.C. 154(b) by 0 days.

(21) Appl. No.: 17/014,614

(22) Filed: Sep. 8, 2020

(65) Prior Publication Data
US 2021/0076147 A1    Mar. 11, 2021

(30) Foreign Application Priority Data

Sep. 10, 2019 (EP) ..................... 19306092

(51) Int. Cl.
| | | |
|---|---|---|
| *H04B 3/00* | (2006.01) | |
| *H04R 27/00* | (2006.01) | |
| *B61L 15/00* | (2006.01) | |
| *B61L 99/00* | (2006.01) | |
| *G08C 17/02* | (2006.01) | |
| *G08C 23/04* | (2006.01) | |

(52) U.S. Cl.
CPC .......... *H04R 27/00* (2013.01); *B61L 15/0027* (2013.01); *B61L 99/00* (2013.01); *G08C 17/02* (2013.01); *G08C 23/04* (2013.01); *H04R 2227/007* (2013.01); *H04R 2420/07* (2013.01); *H04R 2499/13* (2013.01)

(58) Field of Classification Search
CPC ....................................................... H04B 3/00
See application file for complete search history.

(56) References Cited

U.S. PATENT DOCUMENTS

| | | | | |
|---|---|---|---|---|
| 7,458,545 B1 * | 12/2008 | Ricks | ..................... | A63H 19/18 246/1 C |
| 8,408,143 B2 * | 4/2013 | Severson | ................ | A63H 19/14 105/1.5 |
| 2005/0258942 A1 * | 11/2005 | Manasseh | .............. | G07C 5/008 340/425.5 |

(Continued)

FOREIGN PATENT DOCUMENTS

WO    2006/095415    9/2006

OTHER PUBLICATIONS

European Search Report for European Application No. 19 30 6092 dated Oct. 30, 2019, 2 pages.

*Primary Examiner* — Olisa Anwah
(74) *Attorney, Agent, or Firm* — Nixon & Vanderhye

(57) ABSTRACT

The invention relates to a sound diffusion system embedded in a railway vehicle and comprising:
  a plurality of groups of speakers distributed in the cars, each group of speakers being located in a respective diffusion zone of the railway vehicle;
  a control device of the speakers configured to broadcast generic sound signals via the different groups of speakers; and
  at least one reception device, each reception device being associated with a single group of speakers and being able to receive a control signal from a control device outside the railway vehicle, the control device being configured, upon reception of a control signal by one of the reception devices, to broadcast a specific sound signal solely via the associated group of speakers.

14 Claims, 2 Drawing Sheets

(56) References Cited

U.S. PATENT DOCUMENTS

| | | | | |
|---|---|---|---|---|
| 2008/0259945 | A1* | 10/2008 | Catterall | H04L 12/46 |
| | | | | 370/404 |
| 2009/0139147 | A1* | 6/2009 | Mercier | E05F 15/40 |
| | | | | 49/506 |
| 2011/0093144 | A1* | 4/2011 | Goodermuth | B60T 13/665 |
| | | | | 701/20 |
| 2013/0214097 | A1* | 8/2013 | Graber | B61L 23/00 |
| | | | | 246/174 |
| 2015/0251673 | A1* | 9/2015 | Kessner | B61L 15/0027 |
| | | | | 701/2 |
| 2017/0043707 | A1* | 2/2017 | Kirchner | B60Q 1/26 |
| 2017/0232976 | A1* | 8/2017 | Schmidt | B61L 15/0072 |
| | | | | 104/28 |
| 2019/0123703 | A1* | 4/2019 | Schmatz | H03G 3/3005 |
| 2020/0189631 | A1* | 6/2020 | Gorman | B61G 7/14 |
| 2021/0114600 | A1* | 4/2021 | Uno | G08B 21/02 |

\* cited by examiner

SOUND DIFFUSION SYSTEM EMBEDDED IN A RAILWAY VEHICLE AND ASSOCIATED VEHICLE, METHOD AND COMPUTER PROGRAM

CROSS-REFERENCE TO RELATED APPLICATIONS

This application is a U.S. non-provisional application claiming the benefit of European Application No. 19306092.8, filed on Sep. 10, 2019, which is incorporated herein by reference in its entirety.

FIELD OF THE INVENTION

The present invention relates to a sound diffusion system in a railway vehicle.

The present invention also relates to a railway vehicle comprising at least one passenger car and such a sound diffusion system.

The present invention also relates to a method for the diffusion of sounds signals in a railway vehicle implemented by such a sound diffusion system.

The present invention lastly relates to a computer program including software instructions which, when executed by a computer, implement such a diffusion method.

BACKGROUND

WO 2006/095415 discloses a sound diffusion system in a railway vehicle configured to broadcast advertisements.

It is known to display the number of the railway vehicle and its destination at the platform head and to display the number of each car next to the doors thereof so that passengers can easily find their assigned place in the railway vehicle.

However, this mode of communication with passengers is not fully satisfactory, in particular for visually impaired persons who cannot access this information.

SUMMARY

One aim of the invention is thus to propose an information system for passengers allowing improved communication with travelers, in particular with visually impaired persons.

To that end, the invention relates to a sound diffusion system in a railway vehicle comprising at least one car, the sound diffusion system comprising a plurality of groups of speakers distributed in the car(s), each group of speakers comprising at least one speaker and being located in a respective diffusion zone of the railway vehicle; a control device of the speakers, the control device being configured to broadcast generic sound signals via the speakers of the different groups of speakers; and at least one reception device, each reception device being associated with a single group of speakers among the groups of speakers, each reception device being able to receive a control signal from a control device outside the railway vehicle, the control device being configured, upon reception of a control signal by one of the reception devices, to broadcast a specific sound signal solely via the group of speakers associated with said reception device having received the control signal.

According to specific embodiments of the invention, the sound diffusion system also has one or more of the following features, considered alone or according to any technically possible combination(s):

the sound diffusion system comprises at least one group of speakers and at least one reception device associated with each car, in particular at least one group of speakers and at least one associated reception device at each railway vehicle provided with at least one side door and intended for passenger boarding;

each reception device and the associated group of speakers are arranged in a same car, the specific sound signal being a message comprising at least one information item able to differentiate said car from the other cars;

each reception device and the associated group of speakers are arranged in a passenger transport car comprising an access door, at least one speaker from said group of speakers being arranged at a distance of less than 1 m from the access door;

at least one speaker from said group of speakers is arranged on an outer surface of the associated car;

the control device is chosen from the group made up of a remote control configured to communicate with the reception device by radio waves and/or by infrared signals; and a mobile telecommunication terminal configured to communicate with the reception device by electromagnetic waves, for example according to a Wifi® or Bluetooth® protocol; and each specific sound signal is a digital signal.

The invention also relates to a vehicle comprising at least one car and a sound diffusion system as defined above.

The invention also relates to a diffusion method for sound signals in a railway vehicle implemented by a sound diffusion system as defined above, embedded in the railway vehicle, the diffusion method comprising the following steps:

reception by a reception device of a control signal sent by a control device outside the railway vehicle;

transmission by said reception device of the control signal to the control device;

diffusion by the control device, solely via the group of speakers associated with the reception device having transmitted the control signal, of a specific sound signal.

The invention also relates to a non-transitory computer-readable medium including a computer program including software instructions which, when executed by a computer, implement a method for the diffusion of sound signals as defined above.

BRIEF DESCRIPTION OF THE DRAWINGS

The invention and its advantages will be better understood upon reading the following description, provided solely as a non-limiting example, and done in reference to the appended drawings, in which.

DETAILED DESCRIPTION

Figure 1:
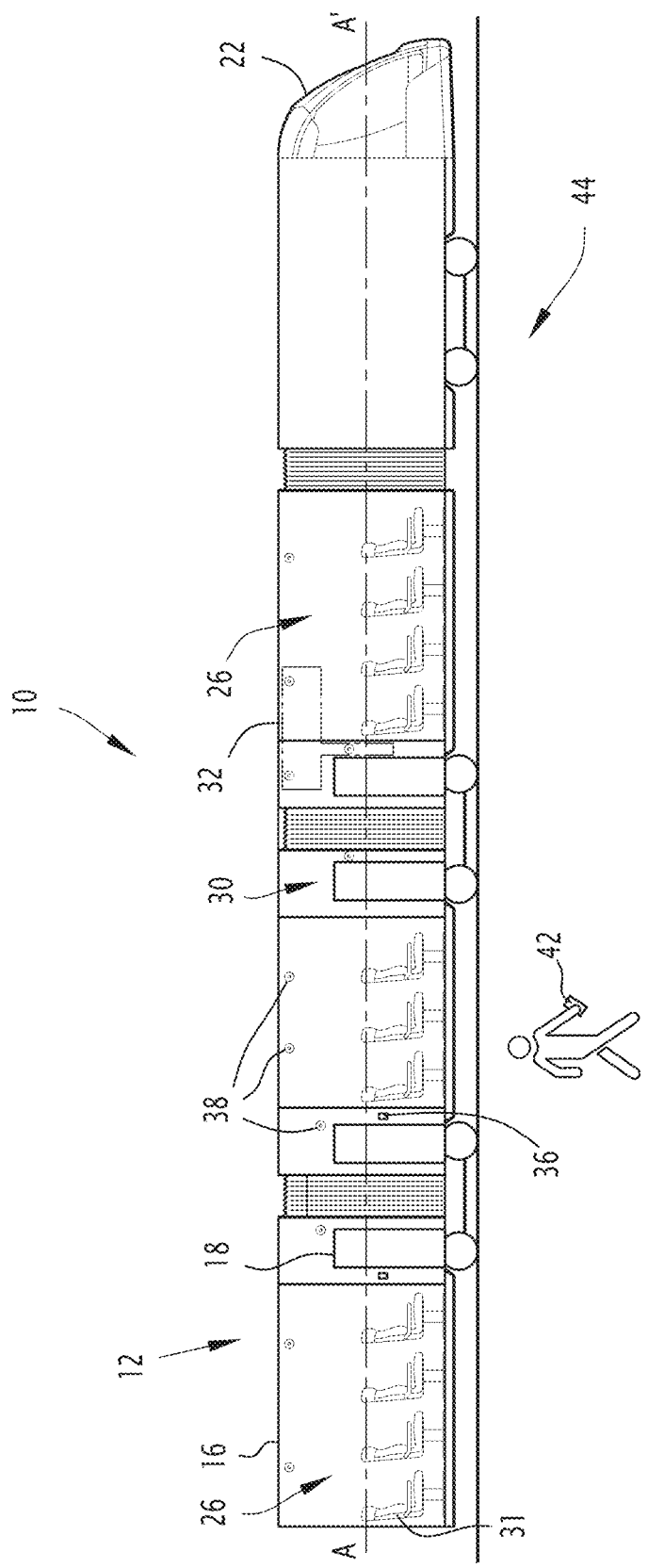
FIG. 1 is a schematic side illustration of a railway vehicle according to the invention.

A railway vehicle 10 configured to allow the transport of passengers is shown in FIG. 1.

The railway vehicle 10 includes at least one passenger transport car 12 and a sound diffusion system 14 embedded in the vehicle 10.

Each car 12 has a rigid body 16 delimiting an inner volume and at least one access door 18 between the inner volume and the outside of the car 12. Each access door 18 is preferably located on a side face of the car 12.

Each car 12 extends along a longitudinal direction A-A' and has two longitudinal ends.

Advantageously, the vehicle 10 comprises a plurality of cars 12 arranged in a line one behind the other. Each car 12 is then connected to each other adjacent car 12 by the adjacent longitudinal ends of these two cars 12.

In the illustrated example, the vehicle 10 comprises a head car 22 defining a head end of the railway vehicle 10 and a plurality of cars 12.

The head car 22 here is a motor car or locomotive, configured to supply the driving energy of the vehicle 10, that is to say to push or pull the cars 12.

The head car 22 here is devoid of passenger compartments and/or access door. In a variant, the head car 22 could be provided with a passenger compartment, the latter being accessible from the adjacent car 12 by a communication bellows or by a side door 18 provided on the head car 22.

Each car 12 delimits a passenger compartment 26. In the illustrated example, each passenger compartment 26 extends over the entire length of the body 16.

Each car 12 further has at least one access platform 30 located at one of the ends of the car 12. Advantageously, each car has two platforms 30 located at the two ends of the car 12.

The passenger compartment 26 comprises at least one level equipped with a plurality of seats 31 for the passengers.

Each platform 30 is connected to the central segment by a door or by a staircase when the platform is located at a different height from the level(s) of the central segment 28.

Each platform 30 is served by at least one of the access doors 18, preferably by two side access doors 18, each access door 18 being provided on a respective side face of the car 12.

The sound diffusion system 14 is configured to broadcast sound messages to the passengers of the vehicle 10.

Figure 2:
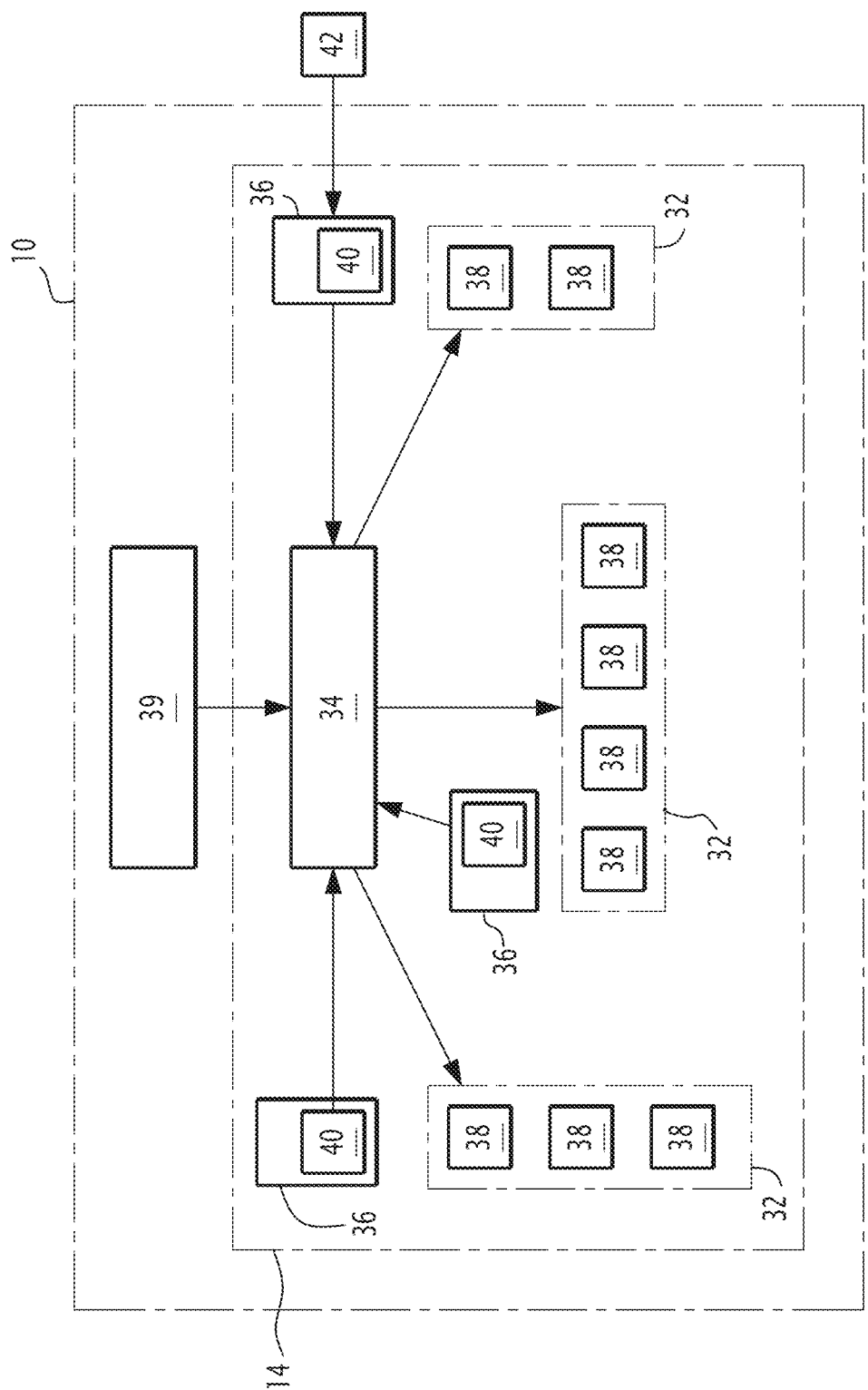
FIG. 2 is a schematic illustration of a sound diffusion system according to the invention embedded in the railway vehicle of FIG. 1.

As visible in FIGS. 1 and 2, the sound diffusion system 14 comprises a plurality of groups of speakers 32, a control system 34 of the speakers and at least one reception device 36.

The plurality of groups of speakers 32 is distributed in the car(s) 12.

Each group of speakers 32 comprises at least one speaker 38 and is located in a respective diffusion zone of the railway vehicle 10, for the diffusion of sound messages in this diffusion zone.

Advantageously, each passenger compartment 26 and each platform 30 comprises at least one group of speakers 32.

Each speaker 38 is an electroacoustic transducer capable of broadcasting a sound signal intended for the passengers located in the corresponding diffusion zone.

The control device 34 is configured to broadcast sound signals via all possible combinations of groups of speakers 32. For example, the control device 34 is able to send a sound signal to all of the groups of speakers 32, to a single group of speakers 32 or to a part of the groups of speakers 32.

Advantageously, the control device 34 is able to control the diffusion power of each group of speakers 32. Thus, each group of speakers 32 has a diffusion power specific to the sound signals.

The control device 34 is configured for the diffusion of generic sound signals via the speakers 38 of the different groups of speakers 32.

A generic sound signal is a sound signal that is intended for all or some of the passengers of the vehicle 10 and that is broadcast by all of the groups of speakers or at least by several groups of speakers.

The generic sound signal is for example a sound message emitted by the driver of the vehicle 10 or a crewmember of the vehicle 10 via a microphone connected to the control device 34 or a sound message generated automatically by the control device 34 and comprising at least one information item relative to the railway vehicle 10 such as the number of the vehicle 10, the final destination of the vehicle 10, a message indicating a departure or an imminent arrival at a train station of the vehicle 10 or a security message for the passengers.

Advantageously, each sound signal is a digital signal. The generation of the messages by the control device 34 is thus facilitated, as well as the integration of the control device 34 into the general structure of the different systems of the vehicle 10.

Advantageously, the control device 34 is configured to receive an audio signal generated by a control and management system 39 of the railway vehicle 10.

The train control and management system 36 is able to control and handle the communication of the various systems of the vehicle 10. The train control and management system 36 is better known by those skilled in the art as TCMS.

The audio signal is for example a message including information about the vehicle 10, a message indicating a departure or an imminent arrival in the train station by the vehicle 10 or a security message for passengers.

The control device 34 is configured to transmit the audio signal to at least one of the groups of speakers 32 in order to broadcast a corresponding sound signal.

The control device 34 is further able to manage the priority of the sound signals. In particular, the control device 34 is configured to assign each sound signal a priority level and to broadcast, via the speakers 38, the sound signals having the highest priority level as a priority. The priority level is for example determined based on the potential impact of the associated message for the safety of the passengers.

Each reception device 36 is associated with a single group of speakers 32 among the groups of speakers 32.

Each reception device 36 comprises an antenna 40. Each reception device 36 is able to receive a control signal from a control device 42 outside the vehicle 10, via the antenna 40.

The control device 42 is advantageously a remote control. The remote control comprises a button able to allow the sending of a signal to the reception device 36.

The remote control is configured to communicate with the reception device 36 by radio waves and/or by infrared signals.

The remote control is advantageously according to standard NF S 32-002. This standard is also used to dimension the remote controls allowing visually impaired persons to ask pedestrian crosswalk lights to turn green. Such a remote control is thus advantageously usable for visually impaired persons for pedestrian crosswalks and for orientation near a railway vehicle 10.

In a variant, the control device 42 is a mobile telecommunication terminal such as a mobile telephone or a digital tablet.

The mobile terminal comprises an application configured to allow the sending of a signal to the reception device 36.

The mobile terminal is configured to communicate with the reception device 36 by electromagnetic waves, for example according to a Wifi® or Bluetooth® protocol. These protocols are well known by those skilled in the art.

The reception device 36 is configured to transmit the control signal to the control device 34 if the reception device 36 receives said control signal.

In one preferred embodiment, the reception device 36 is only able to perform a simple transmission of the control signal and does not perform any processing outside that associated with the transmission, or amplification of this control signal. The reception device 36 is a simple input/output device configured to transmit the control signal that it receives.

The control device 34 is configured, upon reception of a control signal by a reception device 36, to broadcast a specific sound signal only via the group(s) of speakers 32 associated with said reception device 36 having received the control signal.

The specific sound signal is advantageously a message comprising at least one specific information item on the car 12 in which the reception device 36 is installed. A specific information item on the car 12 is for example the number of the car 12, the destination of the car 12 and/or the class of the car ($1^{st}$ class or $2^{nd}$ class). The message comprises, in an optional addition, information on the vehicle 10, the destinations served by the vehicle 10 and/or the departure time of the vehicle 10.

In one advantageous embodiment, at least one group of speakers 32 and at least one associated reception device 36 are arranged in each car 12.

Advantageously, in each car 12, at least one group of speakers 32 and at least one reception device 36 are associated with each side door 18 of said car 12.

Advantageously, each reception device 36 and the associated group of speakers 32 are arranged in a same car 12.

Advantageously, at least one of the speakers 38 of said group of speakers 32 is arranged at a distance of less than 1 m from one of the access doors 18 of the associated car 12.

Said speaker 38 is oriented so as to be heard by a person located outside the car 12.

In one exemplary embodiment, at least one of the speakers 38 of said group of speakers 32 is located on an outer surface of the associated car 12. In a variant or in addition, at least one of the speakers 38 of said group of speakers 32 is arranged at one of the platforms 30 of the associated car 12.

When each reception device 36 and the associated group of speakers 32 are arranged in a single car 12, the specific sound signal is for example a message comprising at least one information item able to differentiate said car 12 from the other cars 12.

The control module 34 and each receiving device 36 are typically made in the form of software programs stored in at least one memory (not shown) and able to be executed by at least one processor (not shown) associated with said memory, the memory and the processor together forming an information processing unit included in the vehicle 10. In a variant, the control device 34 and each reception device 36 are made in the form of a programmable logic component or in the form of a dedicated integrated circuit included in the vehicle 10.

A method for the diffusion of sounds signals in the railway vehicle 10 implemented by the sound diffusion system 14 will now be described.

Initially, the vehicle 10 is stopped, at a train station platform 44.

A passenger, for example a visually impaired person, arrives on the platform 44 and wishes to board one of the cars 12, for example in which a seat 31 is reserved for him.

The visually impaired person advances on the platform 44 and positions himself near one of the cars 12 of the vehicle 10.

The method then comprises a step for reception by one of the reception devices 36 of a control signal sent by a control device 42 outside the railway vehicle 10.

In particular, the control signal is sent via the control device 42 by the visually impaired person present on the train station platform and wishing to find his place in the vehicle 10.

Following the reception of the control signal, the reception device 36 transmits the control signal to the control device 34.

Then, the method comprises a step for broadcasting by the control device 34, only via the group(s) of speakers 32 associated with the reception device 36 having transmitted the control signal, of a specific sound signal.

The specific sound signal is advantageously a message comprising at least one information item able to differentiate the car 12, associated with said reception device 36, from the other cars 12.

The specific sound signal is broadcast at least via a speaker 38 arranged at a distance of less than 1 m from the access door 18 of said car 12.

Thus, the visually impaired person situates himself relative to the vehicle 10. If said car 12 is the car 12 in which the visually impaired person wishes to enter, the visually impaired person thus easily locates the access door 18 to this car 12 and can easily enter the car 12.

If said car 12 is not the desired car 12, the visually impaired person continues to move along the platform.

The sound signal diffusion method then advantageously comprises at least a second iteration of the set of steps previously described when the visually impaired person returns a control signal close to another car 12 of the vehicle 10.

The sound signal diffusion method comprises as many iterations of the preceding steps as necessary until the visually impaired person finds the desired car 12.

One can then see that the present invention has a certain number of advantages.

Indeed, the invention allows an improved communication with travelers, in particular with visually impaired persons.

In particular, the broadcast of a specific sound signal comprising at least one information item on the associated car 12 allows the visually impaired person to situate himself easily on the platform 44 and to enter the desired car 12.

The diffusion system 34 according to the invention has a simple structure integrated into the general communication system of the vehicle 10. Thus, it is not necessary to install specific speakers for the information of visually impaired persons.

Thus, the maintenance of such a system is facilitated. Furthermore, the diffusion system 34 according to the invention is reliable and robust.

Lastly, the diffusion system 34 is able to communicate with reception devices 36 usually in the possession of visually impaired persons, such as a remote control or a mobile telephone.

The invention is not limited to the illustrated embodiments.

In the illustrated exemplary embodiment, the access doors 18 are located at the ends of the cars 12. Of course, in a variant, an access door 18 can be arranged differently, for example longitudinally in the middle of the car 12.

In the illustrated exemplary embodiment, the cars 12 are cars with one level. The invention also applies to a railway vehicle comprising one or several cars with one level and one or several cars with two levels, a passenger compartment being provided on each level of each car with two levels.

The invention claimed is:

1. A sound diffusion system embedded in a railway vehicle comprising a plurality of cars, the sound diffusion system comprising:
    a plurality of groups of speakers distributed in the plurality of cars, each group of speakers comprising at least one speaker and being located in a respective diffusion zone of the railway vehicle;
    a control device of the speakers, the control device being configured to broadcast generic sound signals via the speakers of the different groups of speakers; and
    at least one reception device, each reception device being associated with a single group of speakers among the groups of speakers, each reception device being able to receive a control signal from an outer control device outside the railway vehicle, the control device of the speakers being configured, upon reception of a control signal by one of the reception devices, to broadcast a specific sound signal solely via the group of speakers associated with said reception device having received the control signal,
    wherein each reception device and the associated group of speakers are arranged in a same car among the plurality of cars, the specific sound signal being a message comprising at least one information item that differentiates said car from the other cars from the plurality of cars.

2. The sound diffusion system according to claim 1, wherein the sound diffusion system comprises at least one group of speakers and at least one reception device associated with each car, in particular at least one group of speakers and at least one associated reception device at each railway vehicle provided with at least one side door and intended for passenger boarding.

3. The sound diffusion system according to claim 1, wherein each reception device and the associated group of speakers are arranged in a passenger transport car comprising an access door, at least one speaker from said group of speakers being arranged at a distance of less than 1 m from the access door.

4. The sound diffusion system according to claim 3, wherein at least one speaker from said group of speakers is arranged on an outer surface of the associated car.

5. The sound diffusion system according to claim 1, wherein the control device is chosen from the group made up of:
    a remote control configured to communicate with the reception device by radio waves and/or by infrared signals; and
    a mobile telecommunication terminal configured to communicate with the reception device by electromagnetic waves, for example according to a Wifi® or Bluetooth® protocol.

6. The sound diffusion system according to claim 1, wherein each specific sound signal is a digital signal.

7. A railway vehicle comprising:
    a plurality of cars; and
    a sound diffusion system according to claim 1, embedded in the railway vehicle.

8. A diffusion method for sound signals in a railway vehicle implemented by a sound diffusion system according to claim 1, embedded in the railway vehicle, the diffusion method comprising the following steps:
    reception by a reception device of a control signal sent by an outer control device outside the railway vehicle;
    transmission by said reception device of the control signal to the control device;
    diffusion by the control device of the speakers, solely via the group of speakers associated with the reception device having transmitted the control signal, of a specific sound signal.

9. A non-transitory computer-readable medium including a computer program comprising software instructions which, when executed by a computer, carry out a diffusion method according to claim 8.

10. The sound diffusion system according to claim 1, wherein the at least one information item that differentiates said car from the other cars is a number of said car.

11. The sound diffusion system according to claim 1, wherein the at least one information item that differentiates said car from the other cars is a destination of said car.

12. The sound diffusion system according to claim 1, wherein the at least one information item that differentiates said car from the other cars is a class of said car.

13. The sound diffusion system according to claim 1, wherein the at least one information item that differentiates said car from the other cars comprises at least two of the group consisting of a number of said car, a destination of said car, and a class of said car.

14. The sound diffusion system according to claim 1,
    wherein the at least one information item that differentiates said car from the other cars comprises at least one of a number of said car, a destination of said car, and a class of said car, and
    wherein the message further comprises at least one of destinations served by the railway vehicle and a departure time of the railway vehicle.

* * * * *